United States Patent [19]

Eppli et al.

[11] Patent Number: 5,725,466

[45] Date of Patent: Mar. 10, 1998

[54] PERIPHERALLY DRILLED ROLL FOR THE TREATMENT OF WEB MATERIAL

[75] Inventors: Bernd Eppli; Erich Vomhoff; Heinz-Michael Zaoralek, all of Königsbronn, Germany

[73] Assignee: Schwabische Huttenwerke GmbH, Aalen-Wasseralfingen, Germany

[21] Appl. No.: 507,302

[22] PCT Filed: Feb. 1, 1995

[86] PCT No.: PCT/EP95/00364

§ 371 Date: Apr. 16, 1996

§ 102(e) Date: Apr. 16, 1996

[87] PCT Pub. No.: WO95/22730

PCT Pub. Date: Aug. 24, 1995

[30] Foreign Application Priority Data

Feb. 16, 1994 [DE] Germany ............... 44 04 922.6

[51] Int. Cl.[6] ............................................. F28D 11/02
[52] U.S. Cl. ................................... 492/16; 165/89
[58] Field of Search ..................... 492/46; 165/89, 165/90

[56] References Cited

U.S. PATENT DOCUMENTS

| | | | |
|---|---|---|---|
| 3,120,867 | 2/1964 | Nash | 165/90 |
| 4,964,202 | 10/1990 | Pav et al. | 492/46 |
| 5,054,543 | 10/1991 | Thomas et al. | 165/189 |
| 5,655,596 | 8/1997 | Zaoralek | 165/90 |

FOREIGN PATENT DOCUMENTS

| | | |
|---|---|---|
| 41 090 | 10/1932 | France . |
| 40 36 121 A1 | 1/1992 | Germany . |
| 43 17 873 A1 | 10/1993 | Germany . |
| 43 17 875 A1 | 10/1993 | Germany . |

*Primary Examiner*—Irene Cuda
*Attorney, Agent, or Firm*—Armstrong, Westerman, Hattori, McLeland & Naughton

[57] ABSTRACT

A peripherally drilled roll for the heat treatment of web material, includes a roll body having axially parallel drilled passages disposed just beneath its surface for guiding a heat-carrying fluid, at least one flange pin bolted to the front end of said roll body having a central bore, supply and discharge passages for the heat-carrying fluid in the flange pin, and connecting passages in the flange pin for the axially parallel drilled passages, wherein the supply and discharge passages are formed as blind holes meeting in the flange pin and produce the flow connection between the central bore and the front end ports of the axially parallel drilled passages, and the connecting passages of the axially parallel drilled passages are configured in the flange pin as blind holes meeting therein.

19 Claims, 3 Drawing Sheets

PERIPHERALLY DRILLED ROLL FOR THE TREATMENT OF WEB MATERIAL

The present invention relates to a peripherally drilled roll for the heat treatment of web material of the kind as described in the preamble of claim 1.

In such heating rolls having relatively high heating capacity an externally heated heat-carrying fluid is guided through the roll in axially parallel drilled passages disposed "peripherally" just beneath the surface of the roll.

During the flowing through of the roll the heat carrier gives off part of its thermal energy to the roll so that its temperature reduces. Accordingly, it is avoided in general that the heat carrier flows through the roll in one direction only, since the then resulting drop in temperature translates to the roll causing it to assume a temperature profile sinking from the inflow end to the outflow end. For this reason groups of neighboring drilled passages are interconnected so that the temperature profile is harmonized by temperature compensation actions between the partial flows of the heat carrier flowing through these drilled passages.

In integrated-type heated rolls of chilled cast iron, i.e. having journal pins forming a single component with the actual roll body, the neighboring drilled passages need to be each connected so that at the ends of the roll body additional slanting connecting drilled passages are incorporated to form the desired connection. The same function is satisfied by pockets milled in the roll body or in cap rings which close off the peripheral drilled passages at both ends.

For space reasons in this solution only a three-way design, also called TRIPASS, is possible. In this arrangement the heat-carrying fluid, after entering through the central bore of the pin, gains access to the central bore of the roll body from which it flows through a drilled passage slanting outwardly into the first of each group of three peripheral drilled passages in which it flows to the opposite end of the roll. At the other end of the roll it is directed through one or two intersecting connecting drilled passages in the roll body into the neighboring peripheral drilled passage in which it flows back to the outlet end. Here the redirection of the flow is repeated and the heat-carrying fluid enters the third peripheral drilled passage in which it is returned to the opposite end where it is directed back through a drilled passage guiding slanting inwardly to the central bore of the roll body. In conclusion the heat-carrying fluid leaves the roll either through the central bore of the pin at this end or it is directed back to the outlet end through the central bore of the roll body where it leaves the roll through the central bore of the outlet pin via a so-called double sealing head.

For rolls subject to high thermal and mechanical stress this integral design has shown itself to be inadequate for various reasons. The strength of the roll material alloyed to achieve the necessary hard-wearing properties is relatively low. In the integral design the pin is naturally of the same material, thus resulting in the mechanical load capacity of the roll being strongly restricted.

In addition, the connecting drilled passages in the roll body are sources of trouble. If two drilled passages intersect at an acute angle, then a sharp edge automatically results at the point of intersection which is washed on both sides by heat-carrying fluid. When changes in temperature occur in the heat-carrying fluid this point assumes the temperature thereof very quickly, whereas the remaining areas of the roll adapt to these changes only slowly. This results in thermal stresses which in the past have resulted repeatedly in internal cracks and, finally, in fracture of the roll as a whole.

The afore-mentioned disadvantages resulted in constructing rolls as highly loaded rolls having bolted pins of forged steel and the connecting passages relocated in the pins. One problem involved in this design is that in the pin and, where necessary, also at the ends of the actual roll body there is hardly enough room for accommodating the connecting passages and the holes necessary for bolting. This applies particularly in the case of the roll being driven, the second pin thus failing to be available for the inlet and outlet of the heat-carrying fluid, due to the drive being applied there. Then, as described above, the heat-carrying fluid must be returned to the outlet pin.

For various reasons it is also necessary not to undertake this return flow through the central bore in the roll body. In some countries, namely, heating rolls of this kind are viewed as pressure vessels when the central bore in the roll body exceeds a certain diameter which, however, is often necessary to save weight, for example. It is also often necessary to maintain the central bore free of heat-carrying fluid so as to reduce the amount of heat carrier in the heating circuit.

The two above requirements are to be achieved with a two-way system. The heat-carrying fluid is deflected thereby after having flowed through the first peripheral drilled passage in the pin at the drive end into a neighboring drilled passage in which it flows back to the outlet end. However, a consequential implementation of this system, which also has advantages for reasons of temperature compensation, would mean that each of the peripheral drilled passages in the pin on the inlet and outlet sides necessitates a radial passage connecting the central bore in the pin, the resulting large number of connecting passages in the pin flange resulting in insufficient room being available for the bolting holes for securing the pin to the roll body.

Such a two-way design, also called DUOPASS, may be configured so that in the roll body radial supply passages are provided from the peripheral drilled passages to the central region of the bolted pin. The necessary connections are then located in the central region of the pin, so that the pin flange is available without restriction for the connecting bolts.

The disadvantage found out in this simple arrangement is that both the radial connecting passages in the roll body and the connecting passages in the central pin region constitute a local concentration of heat transfer surfaces which only permit poor insulation, which in addition weaken the roll body at a critical location. Fractures have been experienced with such rolls.

The aim of eliminating all connecting passages in the roll body and relocating these passages in the pin flange is achievable in a two-way design with a certain compromise. By allowing the heat-carrying fluid to flow in supply through two parallel drilled passages and to flow in return also through two further parallel drilled passages, one common radial connecting passage in the pin for each of the two parallel drilled passages is sufficient, resulting in the number of connecting passages being halved and room being created for the bolting holes.

The compromise of this solution is the poorer temperature compensation. Since the temperatures in each of two neighboring drilled passages become identical, the distance to be covered for the heat transport in the roll material in the circumferential direction is doubled and substantially greater differences in temperature result, associated with differences in strain in the radial direction. In the case of higher thermal capacities a polygon effect occurs which may be the cause for vibrations in operation.

Another possibility of improving this situation consists of combining the three-way system with the two-way system, by causing the heat-carrying fluid to return in each of two parallel peripheral drilled passages to the drive end and in a third peripheral drilled passage (see German laid-open patent 40 36 121, FIG. 5). In this arrangement the velocity of the heat-carrying fluid in the returning third drilled passage doubles, and the associated improved heat transfer from the heat carrier to the roll as a function of velocity ensures a partial compensation of the drop in temperature in the heat carrier itself. Almost total compensation may be achieved in this system, also called TRIPASS, by partially introducing displacement inserts in the peripheral drilled passages with which a local fine-adjustment of the flow velocity of the heat carrier and thus of the heat transfer to the roll is possible.

Configuring the connecting passages in the pin flanges of existing systems is based either on straight drilled passages with which, the same as before in the roll body, connections are created between peripheral and central bores, or by milling pockets in the front flange surfaces, or in the combination of both features.

Actual practice has indicated that particularly distributing the heat-carrying fluid by milled pockets in the pin flange is complicated. For differing roll sizes the dimensions of the pockets change and thus also the insulating inserts of a material having poor thermal conduction. These thus need to be dimensioned and fabricated individually, which makes the necessary insulation expensive. Due to the close association of pockets and bolting holes in cramped space only narrow sealing surfaces are available e.g. for gasket pastes on the lands between them. At the sealing surfaces between flange and roll body namely the passage of the heat-carrying fluid to the bolting holes has to be prevented, otherwise leakage could result which particularly in the case of heating oil as the heat carrier is a big nuisance.

The fact that these pockets also extend in the radial direction at the pin flange makes the application of rotative sealing rings towards the central bore impossible on such systems.

The object of the present invention is to provide a peripherally drilled roll which overcomes the disadvantageous properties of prior art as described above, particularly avoiding critical differences in temperature in the roll body, makes available a good seal of the flange pins and provides sufficient room for bolting holes and connecting passages.

This object is achieved by the features of the roll according to the invention as described in the characterizing clause of claim 1.

By configuring the supply and discharge passages for the heat-carrying fluid as blind holes merging in the flange pin which produce the fluid connection between the central bore and the front end ports of the peripheral axially parallel passages, the critical zones, namely the deflection zones for the heat-carrying fluid out of the roll body, are advantageously relocated into the flange pin, resulting in the thermal stresses and strains occuring at these locations no longer affecting the actual roll body. Due to the optimizing selectable arrangement of blind holes with respect to each other, there is thus also the possibility of avoiding sharp deflection edges for the heat-carrying fluid which in turn has a positive effect in harmonizing the heating of the flange areas. By suitably arranging the blind holes, the production of which is possible by simple means, this also creates room for the bolting holes to be included.

The connecting passages of the axially parallel drilled passages are according to the invention also configured in the flange pin as merging blind holes.

Here too, the special advantage afforded is that by an arbitrary arrangement of blind holes, the connecting point of which may be disposed at any suitable location within the pin, room is made available for the necessary bolting holes. In addition, the surfaces of the flange between the ports of the blind holes are favorably available as sealing surfaces, so that leakages can be substantially avoided. Furthermore, the roll according to the invention makes it possible to employ rotative sealing rings due to the variable arrangement possibility of the connecting passages and the supply and discharge passages and implementation of a pure DUOPASS circuit for the heat-carrying fluid. Sufficient room is still available for the bolting holes in the pin at the guide end even in the case of a pure two-way system in which each of the peripheral axially parallel drilled passages has precisely one supply and one discharge passage to the central bore in the pin.

All connecting passages are achieved in the pin flange by a blind hole being provided at specific radial and axial angles in the pin flange from the point at which the axially parallel drilled passage to be connected meets the pin flange. To then produce the connection to the central bore and a further peripheral drilled passage, a second blind hole is produced in the pin flange from said drilled passage again at a specific angle which meets said first blind hole, thus producing the connection. Accordingly all connecting passages in the flange pin comprise drilled passages which meet at differing angles. It is thus possible to produce the insulation in the connecting passages by the simple means of cutting tubular pieces of a thermally insulating material suitably to length and inserting them into the connecting passages resulting in them being safeguarded from turning without any further effort; turning namely of these tubular pieces could result in the passage for the heat-carrying fluid being blocked up.

Preferred embodiments of the peripherally drilled roll according to the invention are defined by the subordinate claims.

An advantageous configuration of the peripherally drilled roll according to the invention is characterized by the supply and discharge passages connecting each of the regions of the central bore supplying and discharging the heat-carrying fluid to two neighboring ports of the axially parallel drilled passages in a first flange pin and the two neighboring axially parallel drilled passages of the roll body being connected to each other by the connecting passages in a second flange pin.

In this way the pure two-way or DUOPASS system of a peripherally and axially parallel drilled roll is achieved. A suitable arrangement of the blind holes in radial and axial orientation makes sufficient room available for the blind holes, whilst the advantages of the two-way system as regards the favorable compensation of temperature in the roll body are able to be fully exploited.

According to a further preferred embodiment the peripherally drilled roll is configured such that the region of the central bore supplying the heat carrier of a second flange pin is connected via a supply passage to a first axially parallel drilled passage, this first axially parallel drilled passage being connected in said first flange pin by a connecting passage to a second neighboring axially parallel drilled passage, said second axially parallel drilled passage in turn being connected via a connecting passage in said second flange pin to a neighboring third axially parallel drilled passage, and said third axially parallel drilled passage being connected at its port at said first flange pin via a discharge passage to the heat carrier discharging region of the central bore of said first flange pin.

Such a three-way system, also called TRIPASS, is to be especially preferred for non-driven rolls. Since half of the supply and discharge passages can be located in the second flange pin by this design, sufficient room is available in each pin for the bolting.

In a further preferred embodiment the axially parallel and peripherally drilled roll may be defined within the scope of the present invention so that the heat carrier supplying region of the central bore of the first flange pin is connected via a supply passage to the connecting passage of two neighboring axially parallel drilled passages at the point of intersection of the two blind holes forming this connecting passage. In this arrangement the ports of the two axially parallel drilled passages at the second flange pin are connected by connecting passages to two further neighboring axially parallel drilled passages, these neighboring axially parallel drilled passages serving as return drilled passages for the two surrounding them and the port of the return drilled passage in the first flange pin is connected via a discharge passage to the heat carrier discharging region of the central bore of the flange pin.

By these means also the combination of the two and three-pass systems, the so-called TRIPASS-2 system, for the heat-carrying fluid is achieved within the scope of the present invention. By exploiting the high velocity in a return drilled passage for two supply drilled passages a consistent heat transfer may be created around the circumference of the roll, whilst on the other hand making sufficient room available for the necessary bolting holes.

Preferably, the connecting passages and the supply and discharge passages in the pin flanges are disposed radially and axially with respect to each other in all embodiments according to the invention so that between them adequate room remains for the bolts connecting the flange pin to the roll body. There is thus the possibility of spacing apart the points of intersection of each of the passages by differing angular arrangements so that e.g. even countersunk bolts find adequate space in the flange body.

It is suitable for the connecting passages and/or the supply and discharge passages in the flange pin of the peripherally drilled roll according to the invention to be insulated from the flange pin by tubular pieces of thermally insulating material.

Such tubular pieces are available from professional sources and can be sawn to length as required for the corresponding blind holes, this resulting in a self-locking feature to prevent turning at the point of intersection of the blind holes. In this way an insulation is achievable which is cheaper and universally applicable for all types of rolls than that of prior art.

The roll according to the invention may be preferably configured so that the ports of the axially parallel drilled passages in the roll body and the ports of the flange pin connecting passages meeting the latter are sealed off from the environment by rotative sealing elements, preferably plastic-coated metallic C-rings. Sealing between pin and roll body is done by machining a circular recess in the front end of either the roll body or of the pin flange, the diameter of which includes both the orifice of the peripheral drilled passage in the roll body and the elliptical orifice of the connecting drilled passage in the pin flange, possibly resulting from the connecting drilled passages being disposed at an angle to the flange surface. Within the outer circumference of this recess, sealing elements, preferably so-called C-rings, are inserted which seal off the connection between the peripheral drilled passage in the roll body and the connecting drilled passage in the pin flange as regards both the bolting holes and the outer and inner roll diameter.

These seals are advantageously uniform for all types of rolls and diameters thereof as long as the diameter of the peripheral drilled passages remains the same and can thus be procured in large numbers of a temperature-resistant material cost-effectively.

There is furthermore the possibility of applying additional rotative O-rings for sealing with which the axially parallel drilled passages in the roll body and flange pin connecting passages having merging ports can be sealed off to prevent emergence of the heat-carrying fluid. This provides additional assurance against leakage.

In yet a further advantageous embodiment of the roll according to the invention the sealing surface between pin and roll is sealed off by a temperature-resistant gasket paste to prevent emergence of the heat-carrying fluid.

The advantage of using a gasket paste is especially effective in that an adequate sealing surface is also available between the ports of the drilled passages by configuring the connecting, supply and discharge passages as blind holes.

The invention will now be explained in more detail with reference to the enclosed drawings in which:

FIG. 1 shows topmost a partial cross-section through regions of the flange pin and roll body in the area of the flange with the supply and discharge passages sages for the heat-carrying fluid for a DUOPASS roll, below a schematic top view of a DUOPASS roll illustrated shortened, in which the routing of the supply and discharge passages as well as that of the connecting passages is indicated; and below this, the detail X taken from the topmost illustration with a sealing metallic C-ring;

Figure 1A:
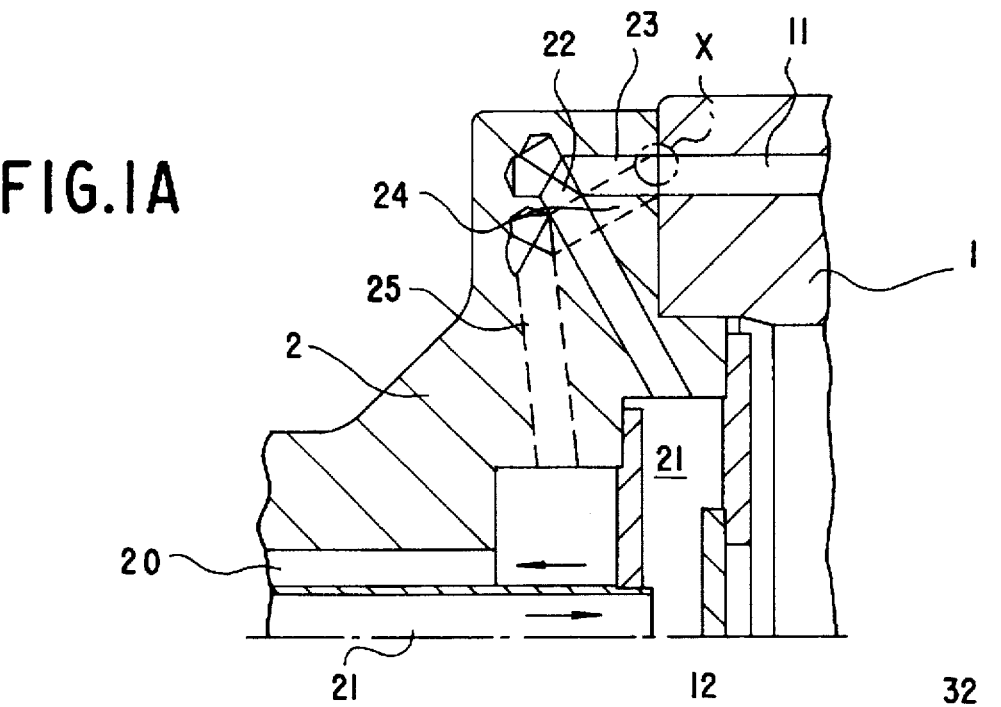

Topmost in FIG. 1 is shown a flange pin 2 flanged to a roll body 1. The flange pin has a central bore with a region 21 for the supply of heat-carrying fluid and a region 20 for discharging the heat-carrying fluid. From the region 21 a blind hole 22 forming part of a supply passage 22,23 leads at an angle into the outer region of the flange pin 2. It merges at its end in the further blind hole 23 forming the second part of the supply passage 22,23, this blind hole having its port at the front end of the flange pin 2. This port of the blind hole 23 coincides precisely with the port of the axially parallel peripheral drilled passage 11 in the roll body 1. Further indicated in the flange pin disposed downstream of the supply passage 22, 23 is a discharge passage 24, 25 comprising a first blind hole 24 merging into an axially parallel drilled passage (not shown) of the roll body and a further blind hole 25 meeting said blind hole 24 at its end in the flange pin 2, said blind hole 25 merging at its other end in the region 20 for discharging the heat carrier of the central bore of the flange pin 2.

Illustrated in the middle of FIG. 1 is a top view of the two-way system shown in the upper illustration with a schematic illustration of the arrangements of the passages. It will be evident from this that the heat-carrying fluid, after flowing through the central bore region 21 and the blind hole 22 enters through the blind hole 23 into the axially parallel drilled passage 11 of the roll body 1. At the other end of the drilled passage 11 the latter merges into a further flange pin 3 in which the connecting passage comprising the two blind holes 31 and 32 is disposed. After passing through the connecting passage 31, 32 the heat-carrying fluid enters the neighboring axially parallel drilled passage 12 of the roll body 1 and flows up to the other end at the first flange pin 2 back through the roll. At the first flange pin 2 the axially parallel drilled passage 12 merges in the first blind hole 24 of the discharge passage 24, 25 and the heat-carrying fluid is able to be discharged through the discharge passage 24, 25 into the region 20 of the central bore discharging the heat carrier.

It is evident that due to a suitable angled arrangement of the blind hole 24 in the flange pin, room can be created for the necessary bolting holes. Furthermore, sufficient room remains between the ports of the blind holes 23 and 24 to be able to expediently seal off the flange with gasket paste.

The illustration at the bottom in FIG. 1 shows on a magnified scale a single cut-out X as indicated in the topmost illustration. It is evident therefrom that the recess disposed in the roll body 1 provides the possibility of inserting a metallic C-ring 40 to seal off the ports of the blind hole 23 of the axially parallel drilled passage 11 of the roll body 1.

The upper illustration of FIG. 2 shows a view corresponding to that in FIG. 1, the components corresponding to those of FIG. 1 being denoted by apostrophed reference numerals. The section view shows the discharge passage 22', 23' comprising the merging blind holes 22' and 23'. The axially parallel peripheral drilled passage 11' of the roll body 1' merges at the flange in blind hole 23', the blind hole 22' merging in the region 20' of the central bore of the flange pin 2' discharging the heat carrier.

The flow in the three-way/TRIPASS system illustrated here is evident from the lower illustration of FIG. 2. From the region of the central bore of the flange pin 3' supplying the heat carrier (not shown here), the heat-carrying fluid flows via the supply passage 35' into the peripheral axially parallel passage 13' of the roll body 1' and is returned to the axially parallel passage 12' via the two merging blind holes forming a connecting passage 25', 24', upon which it is guided via the two blind holes 32' and 31' forming a further connecting passage 32', 31' into the axially parallel passage 11'. From the latter the heat-carrying fluid flows into the two merging blind holes 23' and 22 forming a discharge passage (23', 22') and is discharged into the region 20' of the central bore of the flange pin 2' discharging the heat carrier. In this embodiment too, the blind holes may be suitably disposed so that between their ports sufficient room remains for sealing by gasket paste and adequate space for bolting holes.

FIG. 3 illustrates a configuration of a combined two/three-way system, also called TRIPASS-2, in which corresponding reference numerals in the section views in agreement are denoted by being double apostrophed.

The upper illustration of this Figure shows the region 21" of the central bore of the flange pin 2" supplying the heat carrier which supplies the heat-carrying fluid via a blind hole 22" to the blind hole 23" merging in the axially parallel drilled passage 11". Through the blind hole 22" a further blind hole 24" merging in the latter at the same location receives a supply of heat carrier (not shown here). The discharge passage formed from the merging blind holes 25" and 26" downstream of these supply passages is denoted dashed, it merging in the region 20" of the heat carrier discharging central bore of the flange pin.

The flow in this embodiment is evident from the lower illustration of FIG. 3. Heat carrier from blind hole 22" is supplied to both blind hole 23" and blind hole 24". This heatcarrying fluid passes through the roll body through the axially parallel drilled passages 11" and 12". The further flow will now be explained as an example of the heat carrier flowing in the drilled passage 12". At the end of the roll body 1" the heat carrier enters a blind hole 31" merging in the blind holes 32" and 33" in the flange pin 3". The two blind holes 31" and 32" form the passage connecting the flow from the peripheral drilled passage 12" to the peripheral drilled passage 13". In addition, a flow 33" arriving correspondingly from neighbouring passages enters the blind hole 32" and is routed into the axially parallel peripheral drilled passage of the roll body 1" serving as the return drilled passage 13". In the flange pin 2" it reaches the discharge passage comprising the merging blind holes 25" and 26" and is discharged therethrough into region 20" of the central bore of the flange pin 2" discharging the heat carrier.

Due to the flows of the heat carrier from the blind holes 33" and 31" meeting in the blind hole 32" the heat carrier flows roughly twice as fast in the axially parallel peripheral drilled passage 13" as in the supply drilled passages and can thus assure a heat transfer around the circumference of the roll body which is uniform and dependent on flow velocity.

We claim:

1. Peripherally drilled roll for the heat treatment of web material, comprising
   a) a roll body (1) having axially parallel drilled passages (11, 12) disposed just beneath its surface for guiding a heat-carrying fluid,
   b) at least one flange pin (2) bolted to the front end of said roll body (1) having a central bore (20, 21),
   c) supply and discharge passages (22, 23; 24, 25) for the heat-carrying fluid in the flange pin (2), and
   d) connecting passages (31, 32) in the flange pin for the axially parallel drilled passages, characterized in that
   e) said supply and discharge passages (22, 23; 24, 25) are formed as blind holes meeting in said flange pin (2) and produce the flow connection between said central bore (20, 21) and the front end ports of the axially parallel drilled passages (11, 12), and that
   f) said connecting passages (31, 32) of said axially parallel drilled passages (11, 12) are configured in said flange pin (2) as blind holes meeting therein.

2. The peripherally drilled roll according to claim 1, characterized in that in a first flange pin (2) said supply and discharge passages (22, 23; 24, 25) connect each of said regions (21, 20) of said central bore supplying and discharging the heat-carrying fluid to two neighboring ports of said axially parallel drilled passages (11, 12) and the two neighboring axially parallel drilled passages (11, 12) of said roll body (1) are connected to each other through said connecting passages (31, 32) in a second flange pin (3).

3. The peripherally drilled roll according to claim 1, characterized in that said region of the central bore of said second flange pin (3) supplying the heat carrier is connected via a supply passage (35') to a first axially parallel drilled passage (13), said first axially parallel drilled passage (13) is connected in said first flange pin (2) via a connecting passage (24', 25') to a second neighboring axially parallel drilled passage (12'), said second axially parallel drilled passage in turn is connected via a connecting passage (31', 32') in said second flange pin (3) to a neighboring third axially parallel drilled passage (11') and said third axially parallel drilled passage (11') is connected at its port in said first flange pin (2) via a discharge passage (22', 23') to said region (20') of said central bore of said first flange pin (2) discharging the heat carrier.

4. The peripherally drilled roll according to claim 1, characterized in that said region (21") of the central bore of said first flange pin (2") supplying the heat carrier is connected via a supply passage (22") to said connecting passage (23", 24") of two neighboring axially parallel passages (11", 12") at the point of intersection of said two blind holes (23", 24") forming said connecting passage whilst the ports of said two axially parallel drilled passages (11", 12") are connected at said second flange pin (3) through connecting passages (31") to two further neighboring axially parallel drilled passages (13"), said neighboring axially parallel drilled passages (13") serving as return drilled passages for the two axially parallel drilled passages surrounding them and the ports of the return drilled passages being connected in said first flange pin (2) via a discharge passage (25", 26") to the region (204) of the central bore of the flange pin (2) discharging the heat carrier.

5. The peripherally drilled roll according to one of the claims 1 to 4, characterized in that the connecting passages and the supply and discharge passages are disposed so that between them sufficient room remains for the bolts connecting the/each flange pin (2) to the roll body.

6. The peripherally drilled roll according to one of the claims 1 to 4, characterized in that the connecting passages and/or the supply and discharge passages are insulated by tubular pieces of thermally insulating material with respect to the flange pin (2).

7. The peripherally drilled roll according to one of the claims 1 to 4, characterized in that the ports of the axially parallel drilled passages in the roll body and the ports of the flange pin connecting passages meeting the latter ports are sealed off by rotative sealing members, preferably plastic-coated, metallic C-rings.

8. The peripherally drilled roll according to one of the claims 1 to 4, characterized in that the ports of the flange pin connecting passages are sealed off in radial direction outwardly with respect to the flange edge and inwardly with respect to the bolting holes by rotative sealing rings between roll body and pin flange.

9. The peripherally drilled roll according to one of the claims 1 to 4, characterized in that the ports of the axially parallel drilled passages in the roll body (1) and the ports of the flange pin connecting passages meeting the latter ports are sealed off by a temperature-resistant gasket paste.

10. The peripherally drilled roll according to claim 5, characterized in that the connecting passages and/or the supply and discharge passages are insulated by tubular pieces of thermally insulating material with respect to the flange pin (2).

11. The peripherally drilled roll according to claim 5, characterized in that the ports of the axially parallel drilled passages in the roll body and the ports of the flange pin connecting passages meeting the latter ports are sealed off by rotative sealing members, preferably plastic-coated, metallic C-rings.

12. The peripherally drilled roll according to claim 6, characterized in that the ports of the axially parallel drilled passages in the roll body and the ports of the flange pin connecting passages meeting the latter ports are sealed off by rotative sealing members, preferably plastic-coated, metallic C-rings.

13. The peripherally drilled roll according to claim 5, characterized in that the ports of the flange pin connecting passages are sealed off in radial direction outwardly with respect to the flange edge and inwardly with respect to the bolting holes by rotative sealing rings between roll body and pin flange.

14. The peripherally drilled roll according to claim 6, characterized in that the ports of the flange pin connecting passages are sealed off in radial direction outwardly with respect to the flange edge and inwardly with respect to the bolting holes by rotative sealing rings between roll body and pin flange.

15. The peripherally drilled roll according to claim 7, characterized in that the ports of the flange pin connecting passages are sealed off in radial direction outwardly with respect to the flange edge and inwardly with respect to the bolting holes by rotative sealing rings between roll body and pin flange.

16. The peripherally drilled roll according to claim 5, characterized in that the ports of the axially parallel drilled passages in the roll body (1) and the ports in the flange connecting passages meeting the latter ports are sealed off by a temperature-resistant gasket paste.

17. The peripherally drilled roll according to claim 6, characterized in that the ports of the axially parallel drilled passages in the roll body (1) and the ports in the flange connecting passages meeting the latter ports are sealed off by a temperature-resistant gasket paste.

18. The peripherally drilled roll according to claim 7, characterized in that the ports of the axially parallel drilled passages in the roll body (1) and the ports in the flange connecting passages meeting the latter ports are sealed off by a temperature-resistant gasket paste.

19. The peripherally drilled roll according to claim 8, characterized in that the ports of the axially parallel drilled passages in the roll body (1) and the ports in the flange connecting passages meeting the latter ports are sealed off by a temperature-resistant gasket paste.

* * * * *

UNITED STATES PATENT AND TRADEMARK OFFICE
CERTIFICATE OF CORRECTION

PATENT NO.: 5,725,466
DATED      :  Mar. 10. 1998
INVENTOR(S): Eppli et al.

Figure 1B:
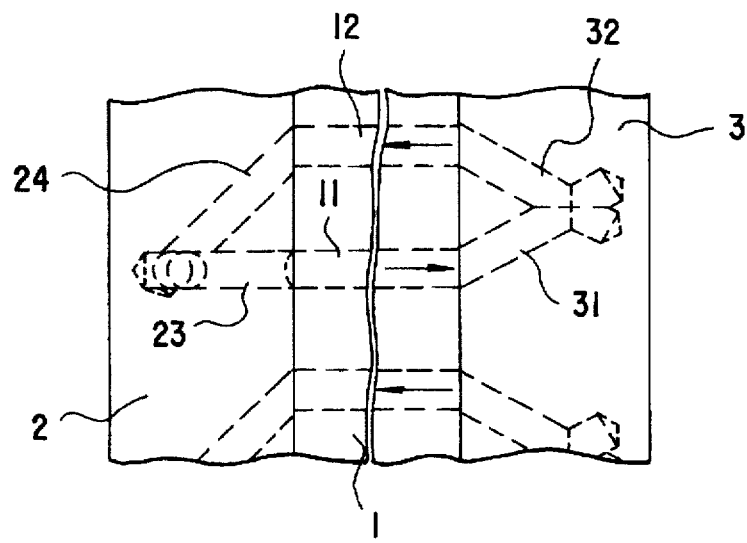
Figure 1C:
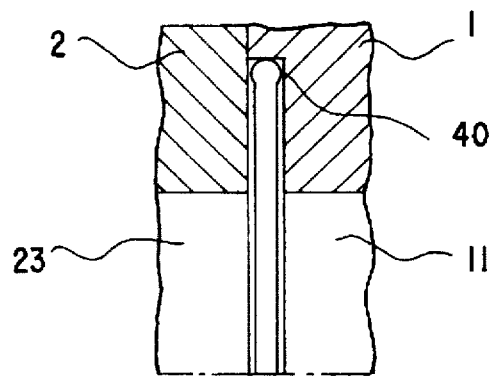
Figure 2A:
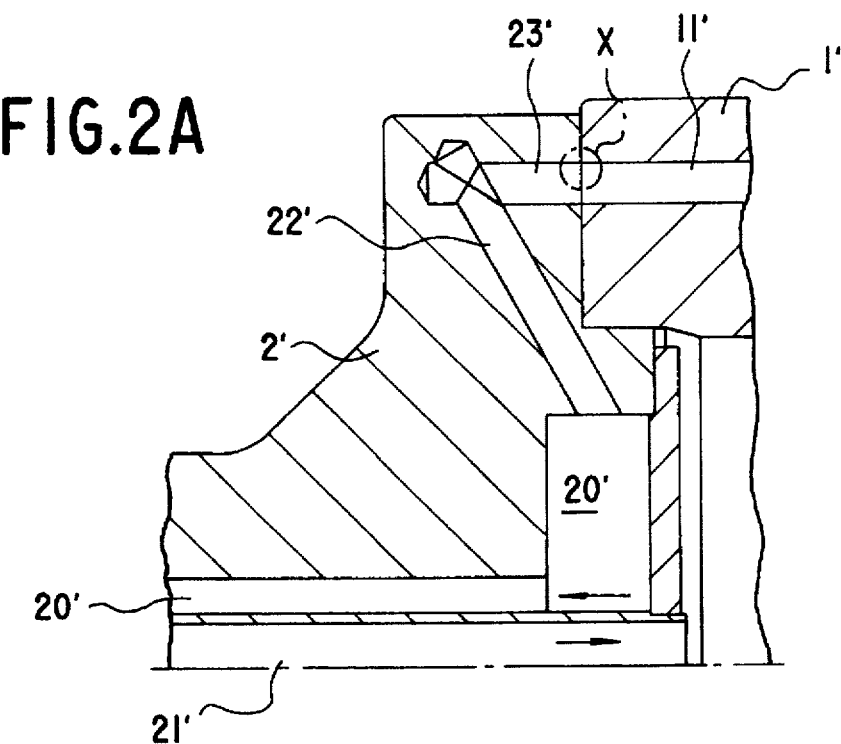
FIG. 2 shows the two upper illustrations according to FIG. 1 for a three-way, i.e. TRIPASS, roll.
Figure 2B:
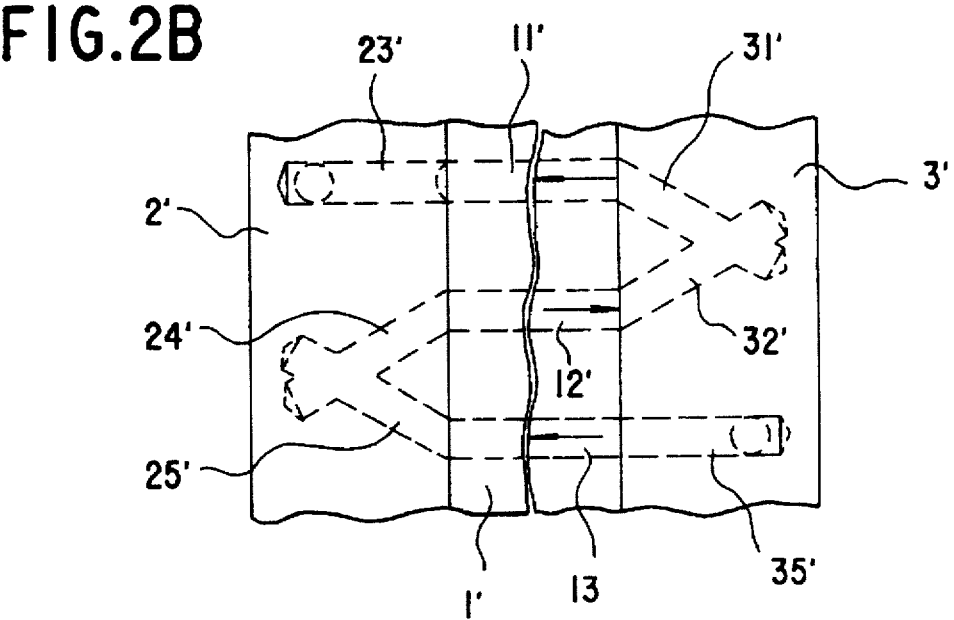
Figure 3A:
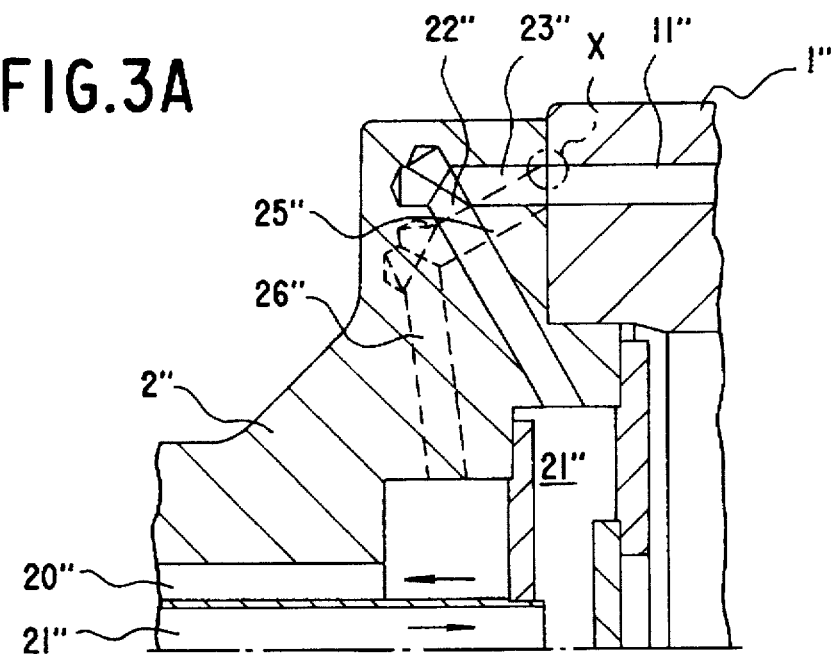
FIG. 3 shows the two upper illustrations according to FIG. 1 for a combination two/three-way, i.e. TRIPASS-2 system.

It is certified that error appears in the above-identified patent and that said Letters Patent is hereby corrected as shown below:

Please amend the specification, as follows:

Page 12, delete lines 8-22 and substitute therefore the following:

–Figure 1A shows a partial cross-section through regions of the flange-pin and roll body in the area of the flange with the supply and discharge passage for the heat-carrying fluid for a DUOPASS roll;

Figure 1B shows a schematic top view of a DUOPASS roll illustrated shortened, in which routing of the supply and discharge passages as well as that of the connecting passage is indicated;

Figure 1C shows a detail x taken from the circle shown in Figure 1A with a sealing metallic c-ring;

Figure 2A shows a partial cross-section taken as in Figure 1A for a three-ring, i.e., TRIPASS, roll;

Figure 2B shows a detail x taken from the circle shown in Figure 2A;

Figure 3A shows a partial cross-section taken as in Figure 1A for a combination two/three way, i.e., TRIPASS-2 system; and

UNITED STATES PATENT AND TRADEMARK OFFICE
CERTIFICATE OF CORRECTION

PATENT NO. : 5,725,466
DATED : Mar. 10. 1998
INVENTOR(S) : Eppli et al.

Figure 3B:
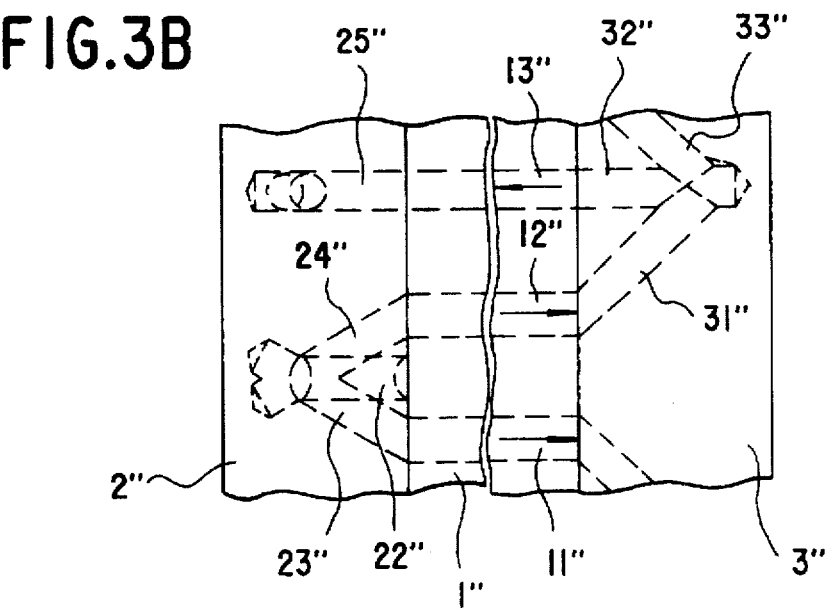

It is certified that error appears in the above-identified patent and that said Letters Patent is hereby corrected as shown below:

Figure 3B shows a detail x taken from the circle shown in Figure 3A.--

Signed and Sealed this

Tenth Day of August, 1999

*Attest:*

Q. TODD DICKINSON

*Attesting Officer*     *Acting Commissioner of Patents and Trademarks*